(12) United States Patent
Repp

(10) Patent No.: US 11,444,802 B2
(45) Date of Patent: Sep. 13, 2022

(54) FIELD BUS SYSTEM WITH A SWITCHABLE SLEW RATE

(71) Applicant: Infineon Technologies AG, Neubiberg (DE)

(72) Inventor: Jens Repp, Markt Schwaben (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/103,579

(22) Filed: Nov. 24, 2020

(65) Prior Publication Data

US 2021/0167991 A1  Jun. 3, 2021

(30) Foreign Application Priority Data

Nov. 28, 2019 (DE) .......................... 102019132273.1
Oct. 29, 2020 (DE) .......................... 102020128430.6

(51) Int. Cl.
*H04L 12/40* (2006.01)

(52) U.S. Cl.
CPC .. *H04L 12/40084* (2013.01); *H04L 12/40013* (2013.01); *H04L 12/4013* (2013.01); *H04L 12/40169* (2013.01); *H04L 2012/40215* (2013.01)

(58) Field of Classification Search
CPC ......... H04L 12/40084; H04L 12/40013; H04L 12/4013; H04L 12/40169; H04L 2012/40215
See application file for complete search history.

(56) References Cited

U.S. PATENT DOCUMENTS

| 9,495,317 | B2 | 11/2016 | Metzner et al. | |
|---|---|---|---|---|
| 9,614,505 | B1* | 4/2017 | Cho | G11C 29/023 |
| 2006/0062341 | A1* | 3/2006 | Edmondson | H04L 7/0337 |
| | | | | 375/376 |
| 2013/0290580 | A1* | 10/2013 | Hartwich | G06F 13/42 |
| | | | | 710/105 |
| 2016/0314092 | A1* | 10/2016 | Suzuki | G06F 1/04 |
| 2017/0109309 | A1* | 4/2017 | van de Burgt | G06F 1/08 |
| 2017/0329388 | A1* | 11/2017 | Pihet | G06F 1/26 |

(Continued)

OTHER PUBLICATIONS

Hartwich, F., "CAN with flexible data-rate," CAN Newsletter, Feb. 2012, 10 pp.

(Continued)

*Primary Examiner* — Henry Tsai
*Assistant Examiner* — Harry Z Wang
(74) *Attorney, Agent, or Firm* — Shumaker & Sieffert, P.A.

(57) ABSTRACT

A circuit has a driver circuit with a slew-rate controller, an output stage and a monitoring circuit. The output stage is connected to a first bus line and to a second bus line, and the driver circuit is designed to control the output stage on the basis of a first logic signal in such a manner that a corresponding bus voltage is produced between the first bus line and the second bus line. The slew-rate controller is coupled to the driver circuit and is designed to set a slew rate of the driver circuit on the basis of an input signal. The monitoring circuit is designed to generate the input signal for the slew-rate controller, wherein the input signal indicates a higher slew rate during an arbitration phase of a data frame contained in the first logic signal than during a data transmission phase of the data frame.

12 Claims, 5 Drawing Sheets

(56) References Cited

U.S. PATENT DOCUMENTS

2018/0343161 A1* 11/2018 Gehring .................. H04L 12/40
2019/0028306 A1* 1/2019 Namise ............... H04L 25/4904
2019/0296938 A1* 9/2019 van de Burgt .... H04L 12/40136

OTHER PUBLICATIONS

ISO 11898-1:2015 "Road vehicles—Controller area network (CAN)—Part 1: Data link layer and physical signalling," Second Edition, Dec. 15, 2015, 74 pp.
SAE J2284-4:2016, "Surface Vehicle Recommended Practice—High-Speed CAN (HSC) for Vehicle Applications at 500 kbps with CAN FD Data at 2 Mbps," Jun. 2016, 28 pp.
SAE J2284-5:2016, "Surface Vehicle Recommended Practice—High-Speed CAN (HSC) for Vehicle Applications at 500 kbps with CAN FD Data at 5 Mbps," Sep. 2016, 30 pp.
Office Action, in the German language, from counterpart German Application No. 102019132273.1, dated Oct. 13, 2020, 9 pp.

\* cited by examiner

FIELD BUS SYSTEM WITH A SWITCHABLE SLEW RATE

This Application claims priority to German Application Number 102019132273.1 filed on Nov. 28, 2019 and to German Application Number 102020128430.6 filed on Oct. 29, 2020, the entire content each of which is incorporated herein by reference.

TECHNICAL FIELD

The present description relates to the field of field buses, for example a Controller Area Network (CAN).

BACKGROUND

The Controller Area Network (CAN) is one of the most frequently used field bus systems in automotive applications. The network topology is usually in the form of a star, and the bus communication is implemented by means of differential signals, wherein a dominant state is represented by a relatively high bus voltage (for example greater than 0.9 V) and a recessive state is represented by a relatively low voltage (for example less than 0.5 V). In other field bus systems, these states are also referred to as "active" and "idle". In practical applications with a bus topology in the form of a star, only a few bus nodes are usually terminated properly.

At higher data rates in particular, the integrity of the bus signal can be impaired by reflections at bus nodes which are not terminated properly or by reflections at low-impedance star points. In the case of rise and fall times of the bus signal which are becoming shorter, the signal integrity can become increasingly worse, which means slow transitions (that is to say a low slew rate) between dominant and recessive states (and vice versa). On the other hand, a low slew rate causes a relatively high loop delay. During the arbitration phase of bus communication in particular, it may be important for the signals to arrive at all bus nodes with only a short delay (relative to one another), which is why the loop delay is intended to be sufficiently short in order to enable proper arbitration. The relevant standards specify a maximum loop delay and therefore indirectly specify a lower limit for the slew rate.

A simple possible way of ensuring sufficient signal integrity involves limiting the line lengths for particular transmission rates (for example longer line lengths for 2 Mbit/s and shorter line lengths for 5 Mbit/s). Other approaches use transceiver circuits with temporary terminations, for example immediately after a signal change has been detected at the bus connections. However, such transceiver circuits should be used only in bus nodes which do not have any proper electrical termination. If they are used in a bus node which has already been terminated, the signal integrity worsens, that is say the temporary termination used by the transceiver is counter-productive. Such transceivers with so-called ringing suppression can also, under certain circumstances, overwrite an error frame of a bus node which is important for the CAN protocol.

It is important to understand that the problems outlined are not limited to CAN systems and can also occur in other field bus systems. An object of the present invention can be considered, inter alia, that of providing a transceiver circuit for a field bus system—and, in particular, for a CAN system with a flexible data rate—which can be used both in terminated bus nodes and on non-terminated bus nodes.

SUMMARY

The object mentioned above is achieved by means of a circuit according to Claim 1 and the method according to Claim 11. The dependent claims relate to various exemplary embodiments and further developments. A circuit for a bus driver is described below. According to one exemplary embodiment, the circuit has a driver circuit with a slew-rate controller, an output stage and a monitoring circuit. The output stage is connected to a first bus line and to a second bus line, and the driver circuit is designed to control the output stage on the basis of a first logic signal in such a manner that a corresponding bus voltage is produced between the first bus line and the second bus line. The slew-rate controller is coupled to the driver circuit and is designed to set a slew rate of the driver circuit on the basis of an input signal. The monitoring circuit is designed to generate the input signal for the slew-rate controller, wherein the input signal indicates a higher slew rate during an arbitration phase of a data frame contained in the first logic signal than during a data transmission phase of the data frame.

A method for controlling the bus lines of a data bus is also described. According to one exemplary embodiment, the method comprises producing a bus voltage between a first bus line and a second bus line on the basis of a logic signal, wherein the bus voltage is changed at a settable slew rate. The method also comprises setting the slew rate, wherein a higher slew rate is set during an arbitration phase of a data frame contained in the logic signal than during a data transmission phase of the data frame.

BRIEF DESCRIPTION OF THE DRAWINGS

Exemplary embodiments are explained in more detail below on the basis of figures. The illustrations are not necessarily to scale and the exemplary embodiments are not only restricted to the aspects described. Rather, importance is attached to illustrating the principles on which the exemplary embodiments are based. With regard to the figures.

DETAILED DESCRIPTION

Figure 1:
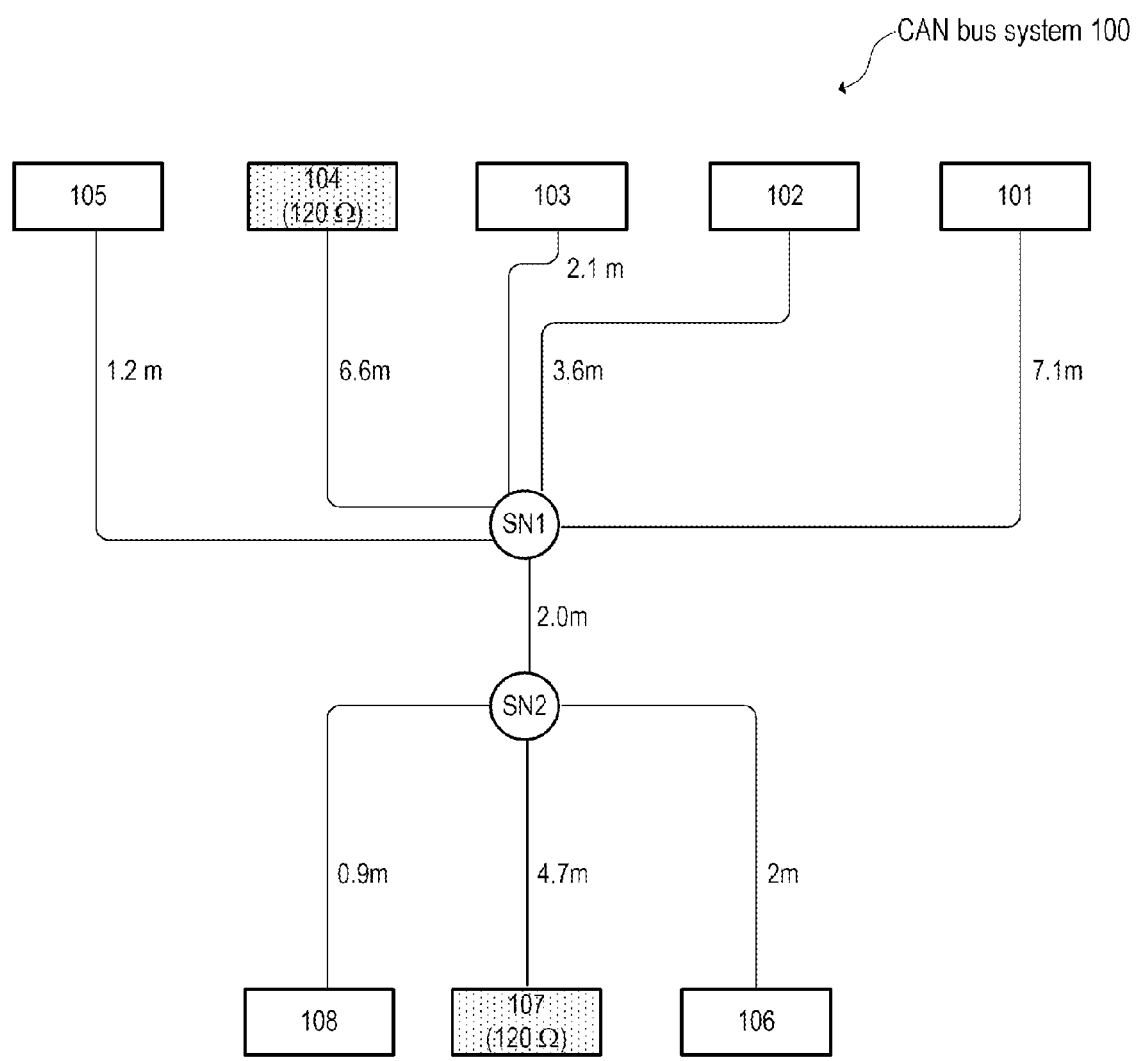
FIG. 1 illustrates an example of a CAN bus system having a multiplicity of bus nodes.

FIG. 1 illustrates an example of a CAN bus system having a multiplicity of bus nodes 101 to 108. The bus system has two subsystems which both have a network topology in the form of a star. The first subsystem comprises the bus nodes 101 to 105, each of which is connected to a first star point SN1. The second subsystem comprises the bus nodes 106 to 108, each of which is connected to a second star point SN2. The two subsystems are coupled, for example, via a bus line which connects the first star point SN1 to the second star point SN2.

The bus lines between the individual bus nodes 101 to 105 and the first star point SN1 and the bus lines between the individual bus nodes 106 to 108 and the second star point SN2 may have different lengths in practice. The line lengths may be between a few centimeters and several meters (for example 10 m or more). In the example illustrated, the maximum distance between two bus nodes is 13.3 m; the bus node 104 is connected to the first star node SN1 via a bus line having a length of 6.6 m. The two star nodes SN1 and SN2 are connected via a bus line having a length of 2.1 m, and the second star node SN2 is connected to the bus node 107 via a bus line having a length of 4.7 m (6.6+2.0+4.7=13.3). The shortest distance (line length of 2.9 m) between two bus nodes is between the bus nodes 106 and 108 (2+0.9=2.9). In the example illustrated, only the bus nodes 104 and 107 respectively have a termination resistance of 120Ω.

An optimum termination of all bus nodes is not readily possible in practice since a manufacturer of bus transceivers does not know the structure of the bus system (topology, line lengths, number of bus nodes). Reflections at the bus nodes and star points and the associated deterioration in the signal integrity are unavoidable in practice.

Figure 2A:
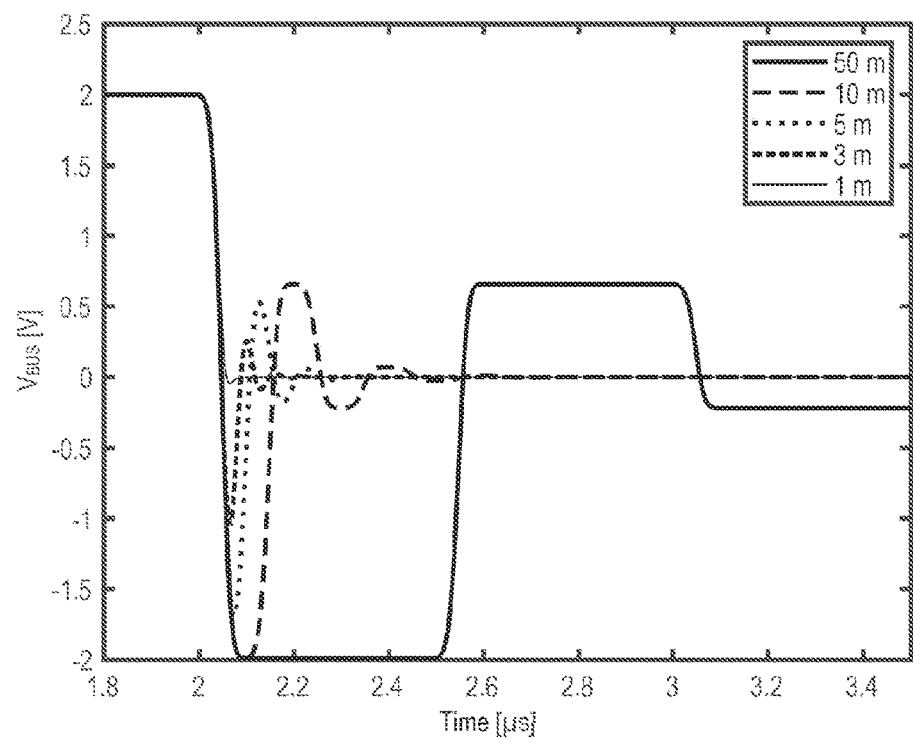
FIGS. 2A and 2B illustrates, by way of example, on the basis of timing diagrams, a relationship between the line length and the ringing (FIG. 2A) and between the slew rate and the loop delay (FIG. 2B) in a bus transceiver of a bus node.
Figure 2B:
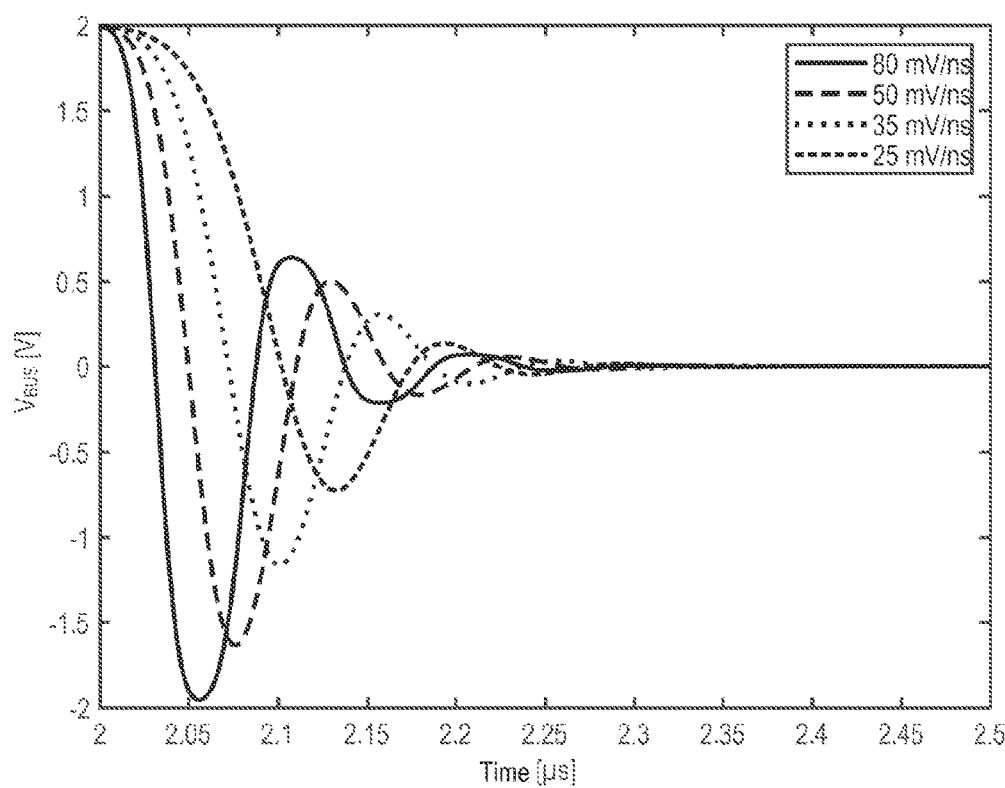

However, for a specific bus topology, there is a relationship between the transmission rate and the maximum lengths of the bus lines. Some developers of bus systems therefore specify maximum line lengths for a particular transmission rate. A further parameter which is relevant to the signal integrity is the slew rate of the transmitter in a bus node. The slew rate specifies (usually in volts per microsecond or millivolts per nanosecond) the gradient of the edges which can be ideally produced by a transmitter (in the case of perfect line termination). Therefore, the slew rate can be considered to be a parameter of the transmitter circuit in a bus node. However, the signal actually present at the bus node depends on the length of the bus line connected to the bus node and the termination. The signal waveforms illustrated in FIGS. 2A and 2B can be measured at the pins CANH and CANL of a CAN transceiver (however, the diagrams in FIGS. 2A and 2B are simulation results), to which a bus line was connected, the other end of which was connected to a termination resistance of 60Ω. Both FIGS. 2A and 2B show step responses of the bus voltage $V_{BUS}$ to a step change from approximately 2 V to 0 V. FIG. 2A shows the (differential) bus voltage $V_{BUS}$ between the pins CANH and CANL at a slew rate of the transmitter circuit of 53 mV/ns and for different line lengths from 1 m to 50 m. FIG. 2B shows the bus voltage $V_{BUS}$ between the pins CANH and CANL in the case of a line length of 5 m and different slew rates between 25 mV/ns and 80 mV/ns. FIG. 2B makes it clear that low slew rates result in longer transmitter delays (with weaker oscillations). The transmitter delay constitutes part of the loop delay mentioned and is the delay between a rising edge at the digital input (see FIG. 5, pin TXD) and the resulting low level of the bus voltage (this is defined as the undershooting of the threshold value for the recessive state). Longer lines and higher slew rates result in stronger transient oscillations which are referred to as ringing (see FIGS. 2A and 2B).

The exemplary embodiments described below relate to a CAN bus system and, in particular, to a CAN bus system with a flexible data rate (FD) which is also referred to as a CAN FD system. CAN FD is an extension of the CAN bus protocol originally specified in ISO 11898-1. The automotive standards SAE J2284-4:2016 and SAE J2284-5:2016 relate to high-speed CAN for automotive applications at 500 kbit/s with CAN FD data transmission at 2 Mbit/s and 5 Mbit/s. In the meantime, CAN FD has been included in the standard ISO 11898-1:2015. It goes without saying that the concepts described here are not necessarily restricted to CAN and CAN FD systems and may, in principle, also be used in other field bus systems. In particular, the concepts and examples described here can also be used in future modifications and extensions of CAN FD systems even if they are no longer referred to as CAN or CAN FD (such modifications are sometimes referred to as "non-ISO CAN FD implementations"). It should also be noted that applications which use CAN systems do not necessarily have to be automotive applications. In addition to automotive applications, CAN systems can also be used in general industrial applications.

Figure 3:
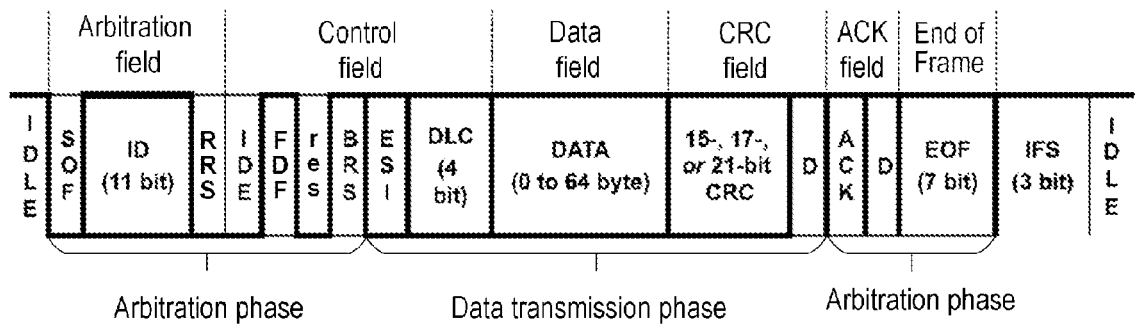
FIG. 3 is a diagram for illustrating the data frame in a CAN bus system with a flexible data rate (CAN FD).

FIG. 3 illustrates, in a diagram, a data frame in a CAN bus system having an 11-bit identifier (ID) (cf. *Florian Hartwich, "CAN with flexible data-rate", in: CAN Newsletter 2/2012, CAN in Automation GmbH, 2012*). Accordingly, a data frame comprises an arbitration phase and a data transmission phase. The data transmission phase is followed by the next arbitration phase which is continued in the next data frame. The individual fields of a data frame and the bits contained in the fields are standardized, are consequently known to a person skilled in the art and are therefore not explained in detail here. For the examples described here, the FDF (FD Format) bit and the BRS (Bit Rate Switch) bit, which are contained in the control field, are relevant. The FDF bit allows a distinction to be made between a CAN frame format and a CAN FD frame format. In CAN FD frames, the FDF bit is always recessive, followed by a dominant res bit. The res bit is a reserved bit which is always transmitted in a dominant manner. The value of the BRS bit decides whether the bit rate in the data transmission phase is the same as in the arbitration phase (BRS dominant) or whether a predefined higher bit rate is used in the data transmission phase (BRS recessive). A switching of the bit rate from the standard rate to the predefined higher rate is therefore indicated by a bit sequence of "FDF recessive, res dominant, BRS recessive" in the control field. The end of the data transmission phase is indicated by the D (Delimiter) bit at the end of the CRC (Cyclic Redundancy Check) field, and the standard rate is used again in the subsequent ACK (Acknowledge) field. The designations of the individual bits are specified in the standard ISO 11898.

During the arbitration phase, the data rate is usually 500 kbit/s or lower, and a plurality of bus nodes can transmit. In order to avoid collisions during the bus communication in the arbitration phase, the bus nodes must be well synchronized and the loop delay of the bus nodes must not exceed a maximum value. In the current ISO standard, the loop delay is specified as a maximum of 255 ns. This maximum value for the loop delay indirectly also determines a minimum value for the slew rate. That is to say, an excessively low slew rate would result in the maximum permissible loop delay (according to the ISO standard) being exceeded, and problems on account of collisions during the bus communication could arise during the arbitration phase. On account of the lower bit rate (which means temporally longer bits), the bus voltage in the arbitration phase has more time to settle, and a comparatively high slew rate is therefore also uncritical (but causes a sufficiently low loop delay).

At the beginning of the data transmission phase, it is possible to switch to a higher bit rate of, for example, 2

Mbit/s or 5 Mbit/s (or more), and only that bus node which has the highest priority and has "won" the arbitration transmits. On account of the temporally shorter bits, ringing is more problematic during the data transmission phase, whereas a comparatively long loop delay is uncritical since only one bus node transmits during a data transmission phase. Therefore, despite the higher data rate in comparison with the arbitration phase, the slew rate can be reduced. In certain situations, the slew rate can even be reduced during the data transmission phase to such an extent that the loop delay exceeds the specified maximum value. The loop delay causes only a constant phase shift.

According to the concept described here, the slew rate is only temporarily reduced during the data transmission phase, whereas the transmitter uses a higher slew rate in the arbitration phase. Depending on the application and for a given network topology, this may even enable yet higher bit rates or longer line lengths (for a particular bit rate).

Figure 4:
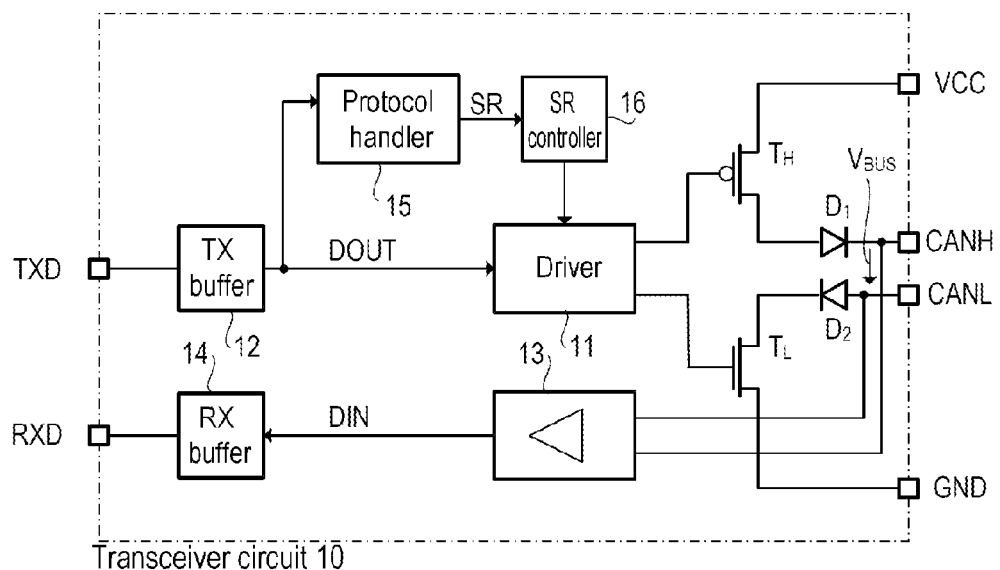
FIGS. 4 and 5 illustrate different variants of an exemplary embodiment of a transceiver circuit which can be used in a bus node.

FIG. 4 illustrates a first example of a transceiver circuit 10 which is designed to set the slew rate of the transmitter circuit contained in the transceiver circuit 10, wherein a higher slew rate (at a lower bit rate) is set in the arbitration phase of a data frame than in the data transmission phase. The transmitter circuit is substantially formed by an output stage (transistors $T_H$ and $T_L$) and a driver circuit 11 which is designed to control the output stage. As mentioned, the slew rate can be considered to be a parameter of the transmitter circuit in a bus node, wherein the actual slew rate is determined by the driver circuit 11. Driver circuits which can switch transistors at a particular, defined slew rate are known per se and are therefore not explained any further here (cf., for example, U.S. Pat. No. 9,495,317). The transceiver circuit 10 may be in the form of an integrated circuit and may be arranged in a chip housing having a plurality of pins (for example CANL, CANL, TXD, RXD, etc.) (cf. also FIGS. 5-7).

In the example illustrated in FIG. 4, the output stage having the transistors $T_H$ and $T_L$ is designed to generate a bus signal which is output as a differential voltage $V_{BUS}$ between the bus connections CANH and CANL. The output stage is typical of a CAN bus system and can be designed differently in other bus systems. The transceiver circuit 10 also has a supply connection VCC and a ground connection GND. The supply connection VCC is supplied with a supply voltage $V_{CC}$ during operation and the ground connection GND is connected to a reference potential $V_{GND}$ (for example ground potential) during operation. The transistor $T_H$ couples the supply connection VCC to the bus connection CANH and the transistor $T_L$ couples the ground connection GND to the bus connection CANL. The transistors $T_H$ and $T_L$ are designed to activate and interrupt a low-impedance current path between the supply connection VCC and the bus connection CANH and to activate and interrupt a low-impedance current path between the bus connection CANL and the ground connection GND in accordance with the control signals output by the driver circuit 11. In the example illustrated, a diode $D_1$ is connected in series with the load current path of the transistor $T_H$ in order to prevent a current flow in the reverse direction. A diode $D_2$ may likewise be connected in series with the load current path of the transistor $T_L$. The diodes $D_1$ and $D_2$ may also be omitted depending on the actual implementation and are therefore optional.

In the example illustrated, the transistor $T_H$ is implemented as a p-channel MOS transistor and the transistor $T_L$ is implemented as an n-channel MOS transistor. The control signals mentioned which are output by the driver circuit 11 are supplied to the gate electrodes of the transistors $T_H$ and $T_L$. The transistors $T_H$ and $T_L$ may each have a multiplicity of transistor cells which can be sequentially switched on and off when switching the transistors on and off in order to generate switching edges having a desired gradient (that is to say with a desired slew rate). As mentioned, driver circuits which are designed to switch transistors at a defined slew rate are known per se (cf., for example, U.S. Pat. No. 9,495,317).

The transceiver circuit 10 from FIG. 4 also comprises a transmission buffer (TX buffer 12) which is designed to receive a data signal at a digital input TDX of the transceiver circuit 10 and to output a corresponding logic signal DOUT. The logic signal DOUT is substantially a binary signal which comprises a bit stream of the data to be transmitted via the bus. The TX buffer 12 is substantially designed to buffer the received data and to output them again, possibly with an adjusted level, as a logic signal DOUT. The logic signal DOUT is supplied to the driver circuit 11 as an input signal, and the driver circuit 11 generates suitable control signals in accordance with the logic signal DOUT in order to control the output stage (transistors $T_H$ and $T_L$) and to output a corresponding bus voltage $V_{BUS}$ between the bus connections CANH and CANL. In other words, the transmitter circuit (driver circuit 11 with output stage) the bus voltage $V_{BUS}$ output between the bus connections CANH and CANL in accordance with the bit stream contained in the logic signal DOUT.

The transceiver circuit 10 also comprises a receiver circuit 13 which is connected to the bus connections CANH and CANL in order to receive the bus voltage $V_{BUS}$ and to generate a corresponding logic signal DIN. That is to say, the receiver circuit 13 detects the level (low or high) of the bus voltage $V_{BUS}$ (for example by means of a comparator) and generates a binary signal (that is to say the logic signal DIN) which indicates the current level of the bus voltage $V_{BUS}$. The transceiver circuit 10 also comprises a reception buffer (RX buffer 14) which receives the logic signal DIN and outputs a corresponding data signal at the digital output RXD. In a similar manner to the TX buffer 12, the RX buffer 14 substantially buffers the data contained in the logic signal DIN and causes a level adjustment, if necessary. Transceiver circuits for CAN systems having a transmitter circuit (driver circuit 11 and output stage), a receiver circuit, TX and RX buffers are known per se and are therefore not described in any more detail.

Figure 5:
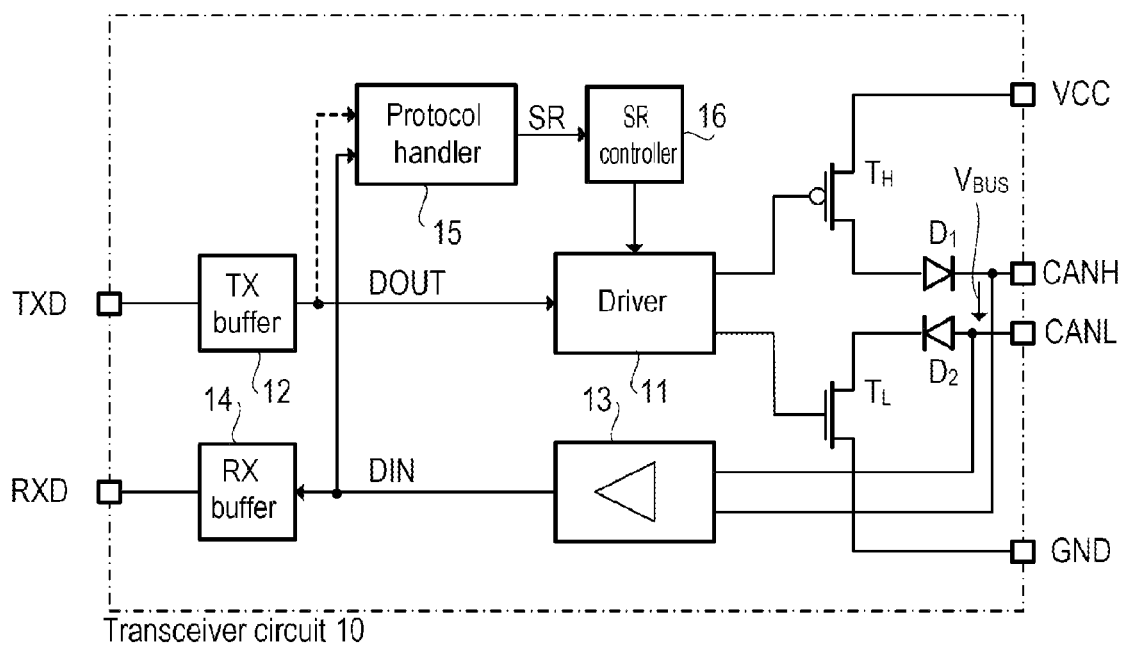

The example from FIG. 5 additionally comprises a monitoring circuit having a protocol handler 15 and a slew-rate controller 16. In the example shown in FIG. 4, the protocol handler 15 is connected to the output of the TX buffer 12 in order to monitor the logic signal DOUT. That is to say, the protocol handler 15 receives the logic signal DOUT at its input and is designed to detect, while taking into account the relevant bus protocol, when the arbitration phase ends and the data transmission begins and conversely also to detect when the data transmission phase ends and the next arbitration phase begins. The protocol handler 15 may be designed to generate a control signal SR which indicates when a data transmission phase begins and ends again. For example, the control signal SR output by the protocol handler 15 may be a logic signal which has a high level (for example logic 1) during a data transmission phase and otherwise has a low level (for example logic 0). The protocol handler 15 may comprise, for example, a finite state machine which is designed to detect the BRS bit or the sequence of the FDF bit, res bit and BRS bit in order to detect a change from the arbitration phase to the data transmission phase. In order to detect the end of the data transmission phase, the finite state machine may also be designed to detect the delimiter bit at the end of the CRC field of a data frame (cf. FIG. 3).

The slew-rate controller 16 receives the control signal SR and is designed to configure the driver circuit 11 to set the slew rate which is used by the driver circuit to a desired defined value. As mentioned, a higher slew rate is used in the arbitration phase of a data frame and a lower slew rate is used in the data transmission phase. If, for example, a high level of the control signal SR indicates the data transmission phase (SR=1), the slew-rate controller 16 can reconfigure the driver circuit 11 in response to this in order to reduce the slew rate. This can be done in different ways depending on the implementation of the driver circuit 11. For example, one or more current sources can be deactivated in the driver circuits in order to reduce the gate current supplied to the transistors $T_H$ and $T_L$ (as a result of which the switching operation becomes slower). In the example mentioned, according to which the transistors comprise a multiplicity of cells which are sequentially controlled with a particular delay in order to switch the transistor at a defined slew rate, the delay mentioned can be increased (for example by changing a resistance or a capacitance) in order to reduce the slew rate. The specific implementation of the driver circuit in order to enable switching at a defined slew rate is of no further importance for the concepts described here and is therefore not explained in any more detail here. Various suitable implications of driver circuits and output stages are known per se to a person skilled in the art.

FIG. 5 illustrates a modification of the example from FIG. 4. In the example from FIG. 5, the protocol handler does not monitor the logic signal DOUT, but rather the logic signal DIN. For the rest, the example from FIG. 5 is identical to the example from FIG. 4 and reference is made to the above description. The logic signal DIN provided by the receiver circuit 13 contains—while the transmitter circuit transmits—substantially the same information as the logic signal DOUT, wherein the logic signal DIN is delayed relative to the signal DOUT by the loop delay mentioned. A delay of the order of magnitude of the loop delay is not critical, however, when adjusting the slew rate, with the result that the protocol handler 15 and the slew-rate controller 16 can be implemented in substantially the same manner as described above with reference to the example shown in FIG. 4. The logic signals DOUT and DIN then comprise the same information if recessive bits output to the bus line (pins CANH and CANL) are not overwritten by another bus node. The protocol handler could detect this and could change back to the arbitration phase if necessary (with an accordingly higher slew rate).

According to a further example, the protocol handler 15 can monitor both logic signals, DIN and DOUT, in order to detect the end of the arbitration phase and the beginning of the data transmission phase. This is indicated by the dashed line in FIG. 5. Monitoring both logic signals makes it possible to detect inconsistencies and therefore to detect errors in the bus communication and to detect a loss of arbitration.

Figure 6:
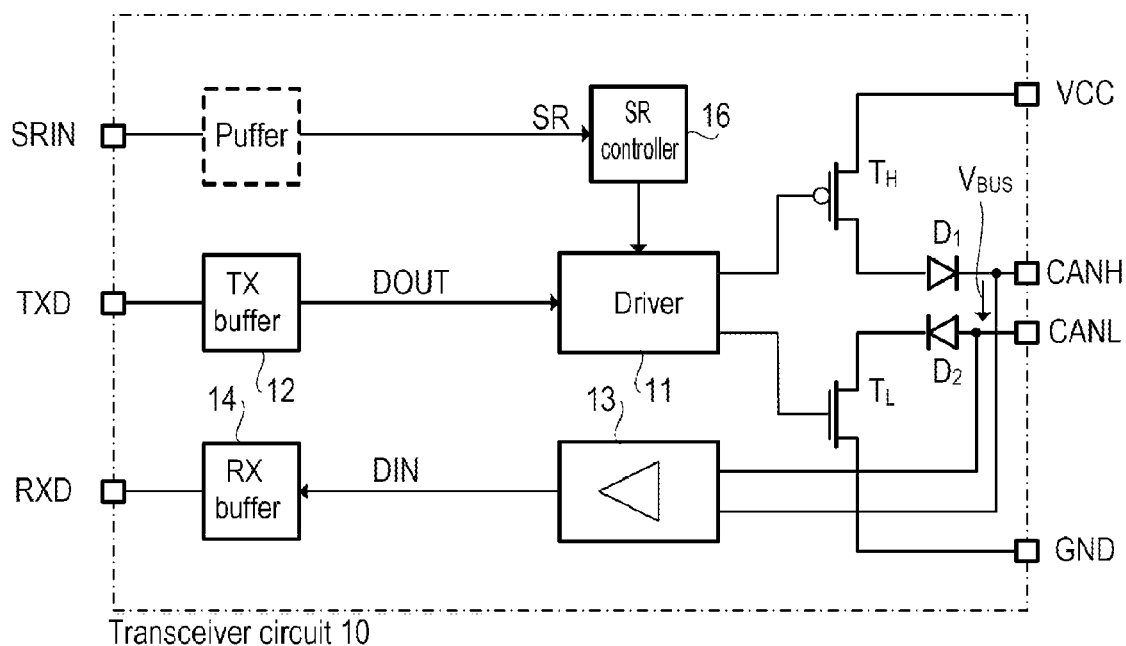
FIG. 6 illustrates an alternative exemplary embodiment.
Figure 7:
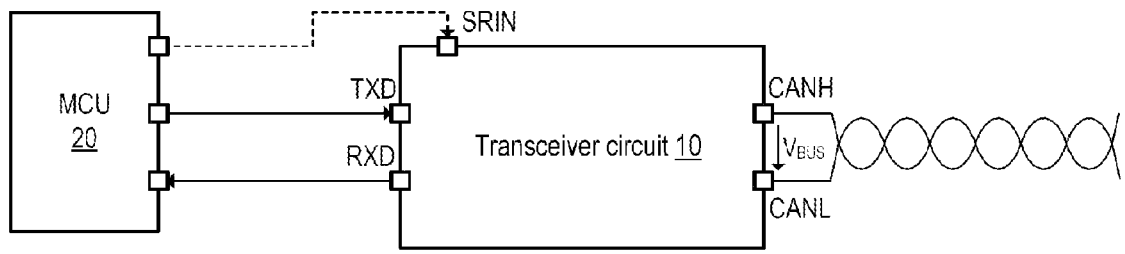
FIG. 7 illustrates an example of a bus node having a microcontroller and a CAN transceiver.

FIG. 6 illustrates a further example of a transceiver circuit. The latter is substantially the same as the examples from FIGS. 4 and 5, but the example from FIG. 6 does not have a protocol handler. Instead, the transceiver circuit 10 (that is to say the above-mentioned monitoring circuit contained therein) has a further digital input SRIN which is designed to receive the control signal SR from an external circuit, for example a microcontroller connected to the transceiver circuit 10. The monitoring circuit may optionally have a buffer for buffering the received control signal SR. The buffer may be constructed in substantially the same manner as the TX buffer 12. An example of an arrangement with a microcontroller 20 and a transceiver circuit 10 connected thereto is illustrated in FIG. 7 (the supply connections VCC and GND have been omitted only for the sake of simplicity). The microcontroller 20 is designed to generate a data signal (having one or more CAN data frames) to be transmitted via the CAN bus and to supply it to the TXD input of the transceiver circuit 10 which outputs a corresponding bus signal $V_{BUS}$ at the bus connections CANH and CANL, to which the bus line (for example a twisted pair cable) is connected. The data signal output by the transceiver circuit 10 at the RXD output is received and processed by the microcontroller 20.

Since the microcontroller 20 generates the data signal (and the data frames contained therein) which is supplied to the TX connection, the microcontroller "knows" when the arbitration phase of a data frame has finished and the data transmission phase begins. The microcontroller can generate the control signal SR which is supplied to the input SRIN of the transceiver circuit 10 (see FIG. 7, dashed line). For example, the microcontroller 20 outputs a control signal SR with a high level at the same time as the BRS bit of a data frame. As mentioned, the transceiver circuit 10 does not require a separate protocol handler in this case and the slew-rate controller 16 can directly process the control signal SR (see FIG. 6).

Figure 8:
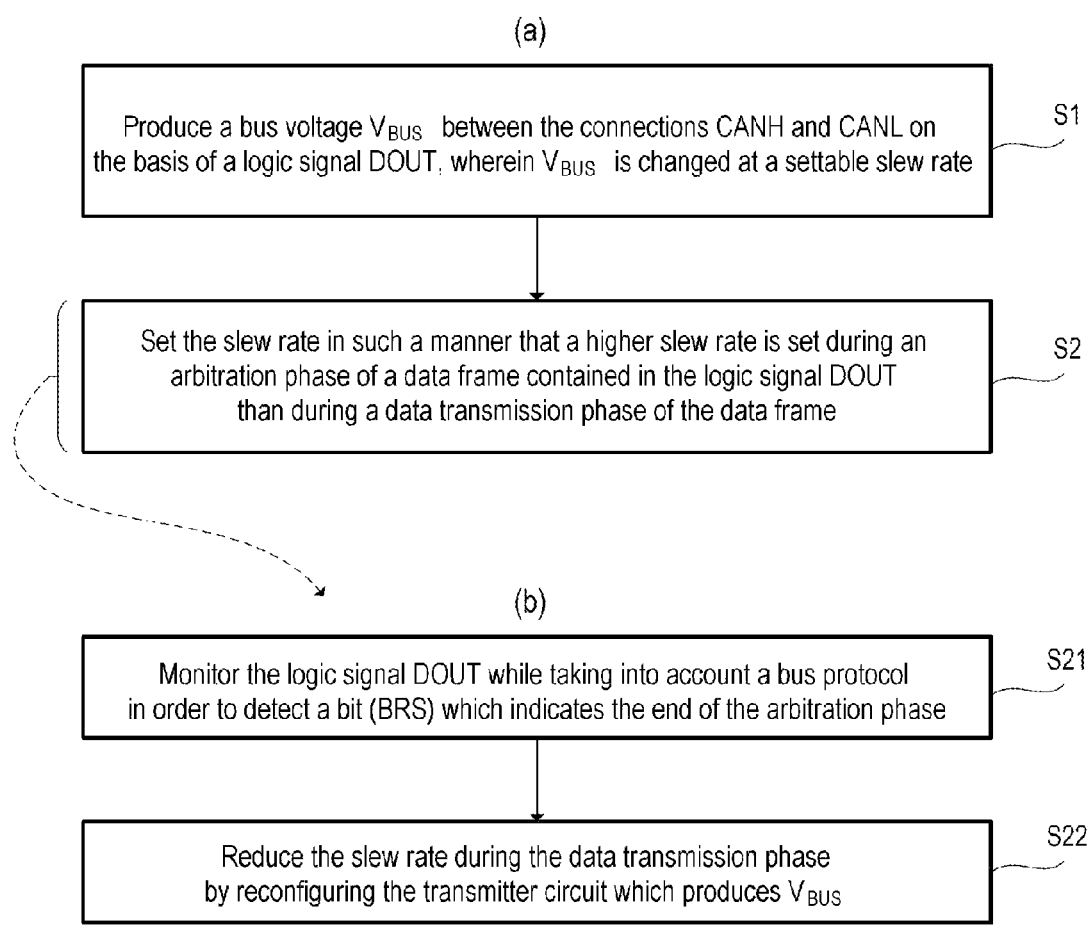
FIG. 8 is a flow diagram that contains two flowchart portions labeled "a" and "b" for illustrating an example of the method described here.

FIG. 8 is a flow diagram that contains two flowchart portions (labeled portion (a) and portion (b)) for illustrating an example of the method described here. According to FIG. 8, portion (a), the method for controlling a bus line comprises producing a bus voltage $V_{BUS}$ between a first bus line (connected to the connection CANH) and a second bus line (connected to the connection CANL) on the basis of a first logic signal DOUT, wherein the bus voltage $V_{BUS}$ is changed at a settable slew rate (see FIG. 8, step S1; also see FIG. 4).

The method also comprises setting the slew rate, wherein a higher slew rate is set during an arbitration phase of a data frame (contained in the first logic signal DOUT) than during the subsequent data transmission phase of the data frame (see FIG. 8, step S2). An example of how the setting of the slew rate can be implemented is shown more specifically in FIG. 8, portion (b). Accordingly, the first logic signal DOUT is monitored while taking into account a bus protocol (also see protocol handler 15 in FIG. 4) in order to detect a bit (in particular the BRS bit) which indicates the end of the arbitration phase (see FIG. 8, step S21). In response to the detection of the bit which indicates the end of the arbitration phase (and therefore the start of the data transmission phase), the slew rate is reduced by reconfiguring the transmitter circuit (in particular the driver circuit contained in the transmitter circuit, cf. FIG. 4) which produces the bus voltage $V_{BUS}$ (see FIG. 8, step 22).

The invention claimed is:
1. A circuit comprising:
an output stage which is connected to a first bus line and to a second bus line;
a driver circuit which is designed to control the output stage on the basis of a first logic signal in such a manner that a corresponding bus voltage is produced between the first bus line and the second bus line;
a slew-rate controller which is coupled to the driver circuit and is designed to set a slew rate of the driver circuit on the basis of an input signal; and a monitoring circuit which is designed to generate the input signal for the slew-rate controller, wherein the input signal indicates a higher slew rate during at least an arbitration field of an arbitration phase of a data frame contained in the first logic signal than during a data transmission phase of the data frame, wherein the data transmission phase of the data frame occurs after the arbitration phase, and wherein the monitoring circuit comprises a protocol handler configured to receive, from a receiver circuit coupled to the first bus line and the second bus line, a second logic signal which represents a current level of the bus voltage and the protocol handler is configured to detect, on the basis of the second logic signal, when the arbitration phase ends and the data transmission phase begins according to a bus protocol.

2. The circuit of claim 1, further comprising:
a transmission buffer which is designed to receive a first data signal and to provide the first logic signal which represents the first data signal.

3. The circuit of claim 1, further comprising a reception buffer which is designed to output a second data signal which represents the second logic signal.

4. The circuit of claim 1, wherein the protocol handler is further configure to receive the first logic signal and to detect, on the basis of the first logic signal and the second logic signal, when the arbitration phase ends and the data transmission phase begins according to the bus protocol.

5. The circuit of claim 1, wherein the bus protocol is a controller area network bus protocol.

6. The circuit of claim 1, wherein the bus protocol is a controller area network bus protocol with a flexible data rate and wherein the protocol handler is designed to detect the bit rate switch bit of the data frame.

7. The circuit of claim 1, wherein the protocol handler is designed to detect the end of the data transmission phase.

8. A method comprising:
producing a bus voltage between a first bus line and a second bus line on the basis of a logic signal, wherein the bus voltage is changed at a settable slew rate;

receiving, from a receiver circuit coupled to the first bus line and the second bus line, a second logic signal which represents a current level of the bus voltage;

detecting, on the basis of the second logic signal, when an arbitration phase ends and a data transmission phase begins according to a bus protocol; and setting the slew rate, wherein a higher slew rate is set during at least an arbitration field of the arbitration phase of a data frame contained in the first logic signal than during the data transmission phase of the data frame, wherein the data transmission phase of the data frame occurs after the arbitration phase.

9. The method of claim 8, wherein the setting of the slew rate comprises: reducing the slew rate during the data transmission phase.

10. The method of claim 8,
wherein the bus protocol is a controller area network bus protocol with a flexible data rate, and wherein the end of the arbitration phase is detected by detecting a flexible data rate format bit and/or a bit rate switch bit of a data frame.

11. The method of claim 8, wherein the setting of the slew rate comprises:
detecting when the data transmission phase ends and the next arbitration phase begins according to the bus protocol, and changing the slew rate at the beginning of the next arbitration phase to a standard value which is higher than the reduced value in the data transmission phase.

12. A circuit comprising:
an output stage which is connected to a first bus line and to a second bus line;

a transmission buffer which is designed to receive a first data signal and to provide a first logic signal which represents the first data signal;

a driver circuit which is designed to control the output stage on the basis of the first logic signal in such a manner that a corresponding bus voltage is produced between the first bus line and the second bus line;

a slew-rate controller which is coupled to the driver circuit and is designed to set a slew rate of the driver circuit on the basis of an input signal;

a monitoring circuit which is designed to generate the input signal for the slew-rate controller, wherein the input signal indicates a higher slew rate during an arbitration phase of a data frame contained in the first logic signal than during a data transmission phase of the data frame;

a receiver circuit which is coupled to the first bus line and to the second bus line in order to receive the bus voltage and is designed to generate a second logic signal which represents a current level of the bus voltage;

a reception buffer which is designed to output a second data signal which represents the second logic signal; and wherein the monitoring circuit has a protocol handler, to which the second logic signal is supplied and which is designed to detect, on the basis of the second logic signal, when the arbitration phase ends and the data transmission phase begins according to a bus protocol.

* * * * *